United States Patent
Chongoushian (10) Patent No.: US 10,237,885 B2
(45) Date of Patent: Mar. 19, 2019

(54) MULTIPLE ACCESS WIRELESS NETWORK WITH LOW LATENCY SUBNET

(71) Applicant: BAE SYSTEMS Information and Electronic Systems Integration Inc., Nashua, NH (US)

(72) Inventor: John H Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 58 days.

(21) Appl. No.: 15/582,871

(22) Filed: May 1, 2017

(65) Prior Publication Data
US 2018/0317247 A1    Nov. 1, 2018

(51) Int. Cl.
| | |
|---|---|
| H04W 72/12 | (2009.01) |
| H04L 12/26 | (2006.01) |
| H04W 72/04 | (2009.01) |
| H04L 5/00 | (2006.01) |
| H04L 12/865 | (2013.01) |
| H04L 12/64 | (2006.01) |
| H04L 29/06 | (2006.01) |

(52) U.S. Cl.
CPC ....... *H04W 72/1242* (2013.01); *H04L 5/0055* (2013.01); *H04L 12/64* (2013.01); *H04L 43/087* (2013.01); *H04L 47/6275* (2013.01); *H04L 63/0428* (2013.01); *H04W 72/0446* (2013.01)

(58) Field of Classification Search
None
See application file for complete search history.

(56) References Cited

U.S. PATENT DOCUMENTS

| | | |
|---|---|---|
| 4,751,701 A | 6/1988 | Roos et al. |
| 5,832,379 A | 11/1998 | Mallinckrodt |
| 5,987,320 A | 11/1999 | Bobick |
| 6,353,729 B1 | 3/2002 | Bassirat |
| 6,556,832 B1 | 4/2003 | Soliman |

(Continued)

OTHER PUBLICATIONS

International Search Report, PCT/US17/52242, ,dated Nov. 29, 2017, 11pages.

(Continued)

*Primary Examiner* — Anh Ngoc M Nguyen
(74) *Attorney, Agent, or Firm* — Maine Cernota & Rardin (57) ABSTRACT

A method is disclosed for minimizing latency for high priority messages without sacrificing subnet bandwidth in a wireless, multiple access network such as Link 16. Nodes are able to simultaneously receive messages on at least two subnets, one of which is designated as a low latency ("LL") subnet that transmits messages immediately on a contention access basis. A message acknowledgement protocol can be implemented and high priority messages that fail due to collisions or other reasons can be retransmitted. Jitter can be used to detect collisions. Embodiments include a plurality of "standard" and/or LL subnets designated for messages of varied urgency. High priority messages can reserve an acknowledgement timeslot for use only by the message recipient. Link 16 embodiments implement CMN-4, whereby the LL subnet is one of four subnets monitored by each node. Link 16 latencies in the LL network can be limited to less than 40 msec.

16 Claims, 6 Drawing Sheets

(56) References Cited

U.S. PATENT DOCUMENTS

| | | |
|---|---|---|
| 6,779,009 B1 | 8/2004 | Zuber |
| 7,020,701 B1 | 3/2006 | Gelvin et al. |
| 7,187,664 B2 | 3/2007 | Hiltunen |
| 7,190,741 B1 | 3/2007 | Manning |
| 7,308,005 B1 | 12/2007 | Roggendorf |
| 7,313,143 B1 | 12/2007 | Bruno |
| 7,813,695 B2 | 10/2010 | Haartsen |
| 8,032,032 B2 | 10/2011 | Chand et al. |
| 8,995,902 B2 | 3/2015 | Reiss |
| 9,066,311 B1 | 6/2015 | Sherman |
| 9,250,312 B1 | 2/2016 | Knibbe |
| 9,451,558 B2 | 9/2016 | Zhu |
| 9,668,228 B2 | 5/2017 | Kim |
| 2002/0172166 A1 | 11/2002 | Arsian |
| 2003/0058959 A1 | 3/2003 | Rafie et al. |
| 2003/0101034 A1 | 5/2003 | Tillotson |
| 2004/0017824 A1 | 1/2004 | Koenck et al. |
| 2005/0003976 A1 | 1/2005 | Haze et al. |
| 2005/0059422 A1 | 3/2005 | Rudolf |
| 2007/0150631 A1 | 6/2007 | Druke et al. |
| 2008/0274702 A1 | 11/2008 | Keller |
| 2010/0002596 A1 | 1/2010 | Wu |
| 2010/0007554 A1 | 1/2010 | Wang |
| 2010/0086088 A1 | 4/2010 | Lie |
| 2010/0098036 A1 | 4/2010 | Li |
| 2010/0296492 A1* | 11/2010 | Jain .................. H04L 1/1854 370/336 |
| 2011/0032191 A1 | 2/2011 | Cooke et al. |
| 2011/0128902 A1 | 6/2011 | Guo |
| 2011/0244786 A1 | 10/2011 | Fujii |
| 2013/0033998 A1 | 2/2013 | Seo |
| 2014/0006575 A1* | 1/2014 | Subramanian ...... H04L 61/2061 709/222 |
| 2014/0050088 A1 | 2/2014 | Song |
| 2014/0050142 A1 | 2/2014 | Song et al. |
| 2014/0286168 A1 | 9/2014 | Kmano et al. |
| 2016/0021596 A1 | 1/2016 | Hui et al. |
| 2016/0262151 A1 | 9/2016 | Chongoushian |
| 2018/0159763 A1* | 6/2018 | Srinivasan ......... H04B 7/18506 |

OTHER PUBLICATIONS

Northrup Grumman Corporation, Understanding Voice and Data Link Networking, Dec. 2014, Guidebook, Distributed by Northrup Grumman, 9326 Spectrum Center Blvd, San Diego, CA 92123-1433, Document No. 135-02-005, 320 pages.

Camana, P., "Finding the Path Forward to Interoperability of the Emerging Link 16 Upgrades", Article [online]. Jan. 4, 2014 [retrieved on Jun. 25, 2018]. Retrieved from Internet: <URL:https://static1.squarespace.com/static/5274112ae4b02d3f058d4348/t/5473cbe4b0a883cf0d7c7d/1416874604915/2014-1-4b.pdf>slide 13.

International Search Report, PCT/US18/30129, dated Jul. 13, 2018, 13 pages.

* cited by examiner

MULTIPLE ACCESS WIRELESS NETWORK WITH LOW LATENCY SUBNET

FIELD OF THE DISCLOSURE

The following disclosure relates generally to secure wireless network communications, and more particularly to methods for enhancing performance in multiple access wireless communication networks.

BACKGROUND

Wireless communication networks are often organized into a plurality of logical communication channels over which messages can be transmitted simultaneously. In some cases, the communication channels are configured as multiple access channels, so that they function as subnetworks, also referred to as "subnets," or simply as "nets."

Providing a plurality of subnets within a multi-access wireless network can be a powerful approach for enabling efficient communications and collaborations, for example by dedicating specific subnets to be used for specific purposes. Nevertheless, it is inevitable that some subnets may be more heavily used than others, thereby leading to inefficient utilization of the available bandwidth as a whole.

Strategies that are employed to enable simultaneous communication in a wireless network include Frequency Division Multiple Access, or "FDMA," Time Division Multiple Access, ("TDMA"), and Code Division Multiple Access ("CDMA"), among others. FDMA is a strategy whereby different channels or subnets communicate simultaneously on different frequencies.

TDMA enables simultaneous communication over a given frequency by defining a plurality of timeslots during which message segments can be transmitted, where the timeslots are repeated once every epoch. In a more general case, FDMA and TDMA can be combined so as to create a network architecture in which a different frequency is assigned to each of a plurality of subnets during each time slot, so that, from the perspective of a given subnet, each epoch comprises a contiguous series of timeslots that may, or may not, vary in frequency over the course of an epoch. In situations where it is desirable to protect the network against eavesdropping and/or malicious interference, the timeslots assigned to each subnet can be configured to "hop" in frequency during each epoch in a pseudo-random manner.

Within a given subnet, transmission access to the available timeslots can be controlled in either of two ways. If message traffic is relatively light, it may be advantageous to implement a "contention" protocol, whereby nodes transmit messages in arbitrarily selected timeslots whenever a need arises. Typically, any messages that are not received due to message "collisions" are retransmitted.

When message traffic on a given subnet is heavier, it may be more efficient to assign or "dedicate" message transmission timeslots to the member nodes in a subnet, so that collisions are avoided. According to this approach, each member node maintains a transmission queue, which may be prioritized according to different levels of urgency, and transmits messages from the queue only during its assigned timeslots during each epoch.

While these strategies for timeslot allocation can provide efficient usage of the available bandwidth, nevertheless significant message transmission latency can arise due to frequent collisions (in the case of a contention strategy), or due to a wide spacing between transmit timeslots (in the case of a dedicated timeslot strategy). These high latencies can be especially problematic in situations where it is necessary to transmit high priority, time sensitive messages that may be delayed due to a high volume of other, lower priority messages.

An example of a multiuser, multiple access wireless network is the Link 16 networking protocol. Link 16 is a widespread tactical wireless networking protocol that is used by frontline land, air, and naval systems in the United States, NATO, and other allied nations to enable multiple users to share situational awareness data. The protocol is based on an omnidirectional waveform that transmits information in pulses spaced 13 microseconds apart and distributed across 51 frequencies. Link 16 implements a TDMA protocol, whereby information is transmitted in sequential timeslots that repeat every TDMA frame, or "epoch."

Link 16 also implements FDMA and CDMA, whereby a unique frequency and encoding key is assigned to each subnet for each timeslot in the epoch. Each of the subnets implements either dedicated access, contention access, or "timeslot reallocation" access as the timeslot access mechanism. Timeslot reallocation is essentially a dedicated access strategy that is periodically updated via a collaborative renegotiation by the nodes. For the purposes of this disclosure, timeslot reallocation can be considered to be a form of dedicated timeslot access.

For each implementation of Link 16, the subnets are grouped into functional areas, and allocated to "Network Participation Groups" (NPGs), also sometimes referred to simply as Participation Groups (PGs), which are virtual subnetworks that are designated to carry messages having specific functions and purposes. This strategy of distributing the subnets among functional NPG's allows the Link 16 network designer to make efficient use of the available bandwidth by determining how the bandwidth will be allocated for each functional group in the network. However, it is inevitable that the communication traffic will be much higher on some subnets/NPG's than on others.

Figure 1:
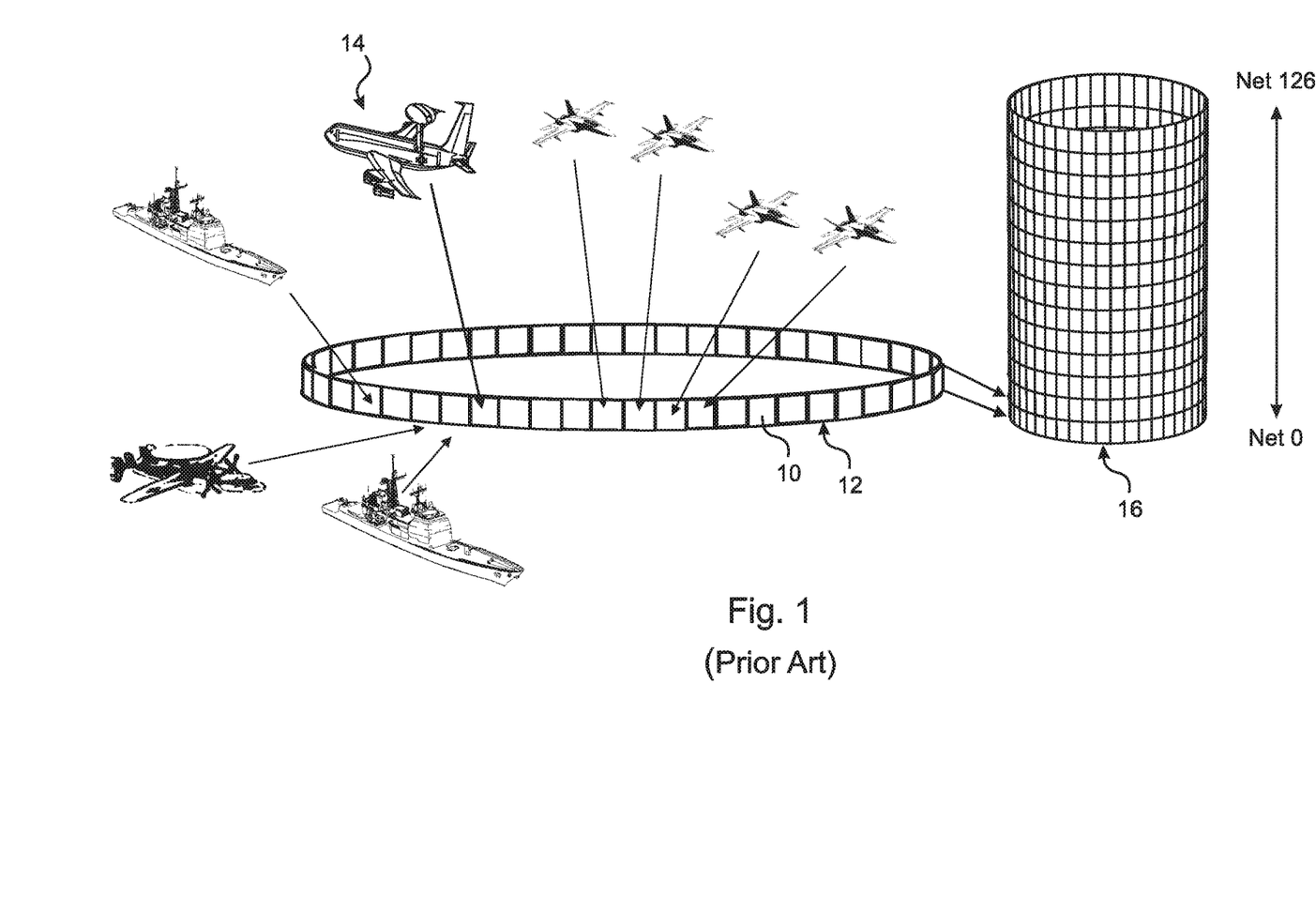
FIG. 1 is a graphical illustration of a typical Link 16 network architecture of the prior art.

A typical link 16 network is shown in FIG. 1. In FIG. 1, the blocks 10 in the single ring 12 represent a series of contiguous timeslots in an epoch that are assigned to a single subnet of the network. The ring 12 is only one logical layer, or subnet, in a logical "stack" 16 of subnets that are included in the network, whereby each timeslot 10 in each epoch is distributed among the plurality of subnets by implementation of FDMA and CDMA. Details of the construction of these Link 16 subnets can be found in MIL-STD-6016, incorporated herein by reference in its entirety for all purposes.

Note that the vertical dimension in the stack of rings 16 does not indicate a simple frequency or code separation between the NPGs or subnets, but is intended only to indicate the logical separation of the subnets. In fact, during each epoch the timeslots assigned to each subnet typically "hop" among various assigned frequencies and coding schemes from one timeslot 10 to the next.

Prior to the start of a mission, the timeslots 10 that have been assigned to each NPG are distributed by a network planner (not shown) among the participant nodes 14 of the NPG as transmit, receive, and relay timeslots. Accordingly, during the course each epoch, each participant 14 in an NPG is given at least one opportunity to transmit a message in an assigned transmit timeslot. If the node has been designated as a relay node, it will also have at least one opportunity during each epoch to relay a message previously received from another node in an assigned relay timeslot. For purposes of this disclosure, a relay timeslot can be considered to be a type of transmit timeslot such that, for a given node 14 in a subnet 12, each timeslot 10 is designated either as a transmit timeslot or a receive timeslot.

Of course, depending upon the implementation, a given participant 14 in an NPG may have more than one transmit timeslot assigned to it during each epoch, and certain users 14 may be given more transmit assignments than other users 14, depending on the expected transmit volume of each of the users 14.

As discussed above, the strategies of contention and retransmission in a contention subnet, and of limiting transmissions to assigned, dedicated timeslots that repeat every epoch in a dedicated timeslot subnet, can lead to significant message transmission latencies, as nodes are forced to wait for retransmissions, or to wait for their assigned transmit timeslots to arrive during each epoch. In Link 16 networks, this latency delay can be several seconds or longer, which can be problematic, if not dangerous, when it is necessary to transmit high priority, time critical messages, for example during a combat mission.

One approach to reducing latency for urgent messages in a subnet is to assign a relatively large number of timeslots during each epoch to nodes of the subnet that perform functions typically requiring low latency. However, in many cases these low latency users do not require high network bandwidth, such that many of these dedicated timeslots go unused and the bandwidth efficiency of the subnet suffers.

What is needed, therefore, is an improved protocol that minimizes latency without sacrificing subnet bandwidth efficiency when transmitting high priority messages over a multiple-access wireless network such as Link 16.

SUMMARY

A method and apparatus are disclosed for minimizing latency without sacrificing subnet bandwidth efficiency when transmitting high priority messages over a multiple-access wireless network such as Link 16. The disclosed apparatus and method take advantage of the inevitable imbalance in subnet usage by dedicating at least one subnet exclusively to the transmission of high priority messages, such that traffic on the other "standard," and generally more heavily used subnets is not affected. In the case of a Link 16 network, the disclosed method is a significant departure from existing approaches in that the low latency ("LL") network is not limited to carrying messages that have specific functions and purposes. Instead, a decision to transmit a message on the LL network is based on a networking requirement, i.e. low latency delivery, rather than on a "real world" categorization of the message, such as "control."

According to the presently disclosed hardware and protocol enhancements, each node in the network is able to monitor at least two subnetworks simultaneously, and each node is able to transmit messages on either of the two subnetworks. At least one of the subnets is designated for transmitting "standard" priority messages, and at least one of the subnets is dedicated for transmitting high urgency, "low latency" messages. As a result, the transmission of high urgency messages has no negative impact on the communication of "standard" priority messages, while nodes that are required to transmit high urgency messages are able to do so with minimal latency.

The at least one low latency subnet operates on a contention basis, whereby low latency messages are transmitted immediately, or in the next timeslot (if timeslots are implemented). Embodiments further include a message acknowledgement protocol that verifies receipt of high priority messages, and in some embodiments messages are transmitted on the low latency subnetwork using "jitter" to ensure that collisions are detected and re-transmissions are promptly scheduled.

Embodiments implement TDMA, FDMA, and/or CDMA on either or both of the subnetworks. Various embodiments include a plurality of "standard priority" and/or a plurality of high priority subnetworks, which can be assigned to transmit messages having varied degrees of urgency.

In some embodiments the nodes are able to transmit on only one subnet at a time, and are not able to receive during intervals when they are transmitting. Accordingly, in these embodiments any assignments of timeslots as being transmit or receive timeslots in standard priority subnets are overridden when the node is transmitting an urgent message on the low latency subnet.

In embodiments of the present disclosure, messages transmitted on the low latency subnet include information that specifies a specific machine receipt ("MR") timeslot during which an MR response should be transmitted indicating successful receipt of the urgent message. According to the embodiment, the MR timeslot can either be a timeslot of the LL subnet, or a timeslot in another, standard subnet, whereby in the latter case the MR timeslot is "donated" by the node to which the MR timeslot was originally assigned.

Embodiments further implement message prioritization, whereby urgent messages to be transmitted by a node are designated as being high priority and are moved to the front of the node's messaging queue and transmitted out of sequence.

In some Link 16 embodiments, the disclosed apparatus and method make use of the "concurrent multi-netting" ("CMN-4") feature, which allows each node to receive messages on four different subnets simultaneously, and thereby allows a node to belong to more than one NPG. According to the present disclosure, at least one of the four subnetworks is designated to be a "low latency" subnet. In various embodiments, the latency of the low latency subnetwork is no greater than 40 milliseconds.

One general aspect of the present disclosure is a method of reducing message latency for high priority messages transmitted over a wireless, multiple access network. The method includes implementing at least one simultaneous messaging protocol so as to create at least two subnets within the network, designating one of the subnets as a low latency subnet, configuring the low latency subnet as a contention access subnet, enabling a plurality of nodes in the network to receive messages simultaneously on the low latency subnet and at least one other of the subnets, enabling the plurality of nodes to designate messages before they are transmitted as being standard messages or high priority messages, and causing the nodes to transmit only messages designated as high priority messages over the second subnet.

In embodiments, transmitting a high priority message on the low latency subnet includes using jitter to ensure that a collision is detected if two high priority messages are simultaneously transmitted on the low latency subnet.

In any of the above embodiments, transmitting a high priority message on the low latency subnet can further include determining if the high priority message was received by an intended recipient and, if the high priority message was not received by the intended recipient, re-transmitting the high priority message to the intended recipient on the low latency subnet.

In any of the above embodiments, implementing the at least one simultaneous messaging protocol can include implementing FDMA.

In any of the above embodiments, implementing the at least one simultaneous messaging protocol can include implementing TDMA so as to define epochs that are subdivided into timeslots. In some of these embodiments transmitting messages over the low latency subnet comprises beginning transmission of the high priority message upon commencement of a next timeslot to arrive after the high priority message is obtained for transmission. And in any of these embodiments, transmitting a high priority message on the low latency subnet can include transmitting instructions designating a subnet and timeslot in which to transmit an acknowledgement message indicating receipt of the high priority message.

In any of the above embodiments, transmitting by a node of a high priority message over the low latency subnet can include moving the high priority message to a front of a queue of messages that are awaiting transmission by the node.

Any of the above embodiments can further include designating a subnet that is not the low latency subnet as a medium priority subnet, configuring the medium priority subnet as a contention access subnet, enabling each of the plurality of nodes to designate messages before they are transmitted as being standard messages, high priority messages, or medium priority messages, and causing the nodes to transmit messages designated as medium priority messages over the medium priority subnet.

In any of the above embodiments, the network can be a Link 16 network that implements FDMA and TDMA. In some of these embodiments, CMN-4 is implemented on the network, thereby allowing the plurality of nodes to simultaneously receive messages on four subnets. In any of these embodiments, the low latency subnet can be associated with a high priority NPG, and nodes can be able to designate messages as high priority messages by assigning them to the high priority NPG. In any of these embodiments, the nodes can be able to designate a message as a high priority message by applying a designated, high priority J-label or J-sublabel to the message. In any of the above embodiments, the Link 16 Concurrent Contention Receive (CCR) functionality can manage timeslot contention in the low latency subnetwork. And any of these embodiments can further include defining an internal time slot assignment that enables nodes to transmit on any time slot in the low latency subnet using net number and cryptographic keys provided in initialization data.

A second general aspect of the present disclosure is an apparatus configured for participation as a node in a wireless, multiple access communication network. The apparatus includes at least one processor, wherein the processor has a user interface, a transceiver in electronic communication with the user interface, at least one antenna coupled to the transceiver, and non-transient software operable on the at least one processor and able to direct the at least one processor to implement at least one simultaneous messaging protocol so as to create at least two subnets within the network, designate one of the subnets as a low latency subnet, configure the low latency subnet as a contention access subnet, enable a plurality of nodes in the network to receive messages simultaneously on the low latency subnet and at least one other of the subnets, enable the plurality of nodes to designate messages before they are transmitted as being standard messages or high priority messages, and cause the nodes to transmit only messages designated as high priority messages over the second subnet.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Disclosed are a method and apparatus for minimizing latency without sacrificing subnet bandwidth efficiency when transmitting high priority messages over a multiple-access wireless network such as Link 16 that includes a plurality of subnets. According to the present disclosure, at least one of the subnets is dedicated exclusively to the transmission of high priority messages, such that traffic on the other "standard," and generally more heavily used subnets is not affected, or is even slightly enhanced due to the diversion of the high priority messages to the high priority, low latency network.

Figure 2A:
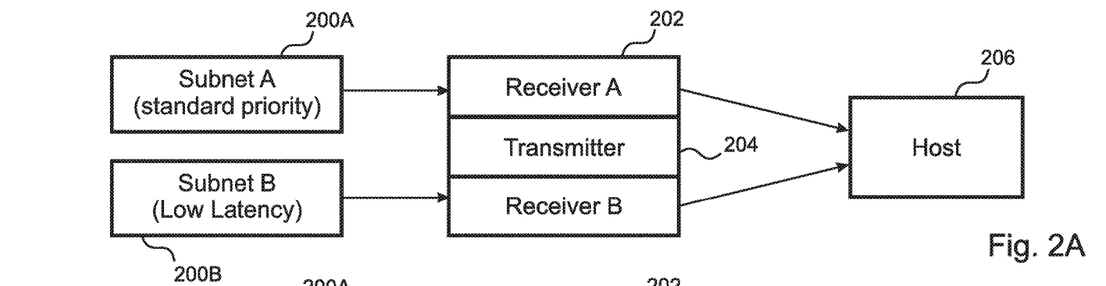
FIG. 2A is a block diagram illustrating a node receiving messages simultaneously from two subnets in an embodiment of the disclosure.

With reference to FIG. 2A, according to the presently disclosure each node 206 in the network is able to monitor at least two subnetworks 200A, 200B simultaneously. In the embodiment of FIG. 2A, the node 206 is in communication with a transceiver that includes two receivers 202 and a single transmitter 204, such that the transceiver is able to receive signals from both subnets 200A, 200B simultaneously when it is not transmitting, and it is able to transmit messages on either of the subnets 200A, 200B, although not at the same time.

As indicated in FIG. 2A, at least one of the subnets 200A is designated for transmitting "standard" priority messages, and at least one of the subnets 200B is dedicated to transmitting high urgency, "low latency" ("LL") messages. As a result, the communication of low latency messages has no negative impact on the transmission of "standard" priority messages, while nodes that are required to transmit high urgency messages are able to do so with minimal latency.

Figure 2B:
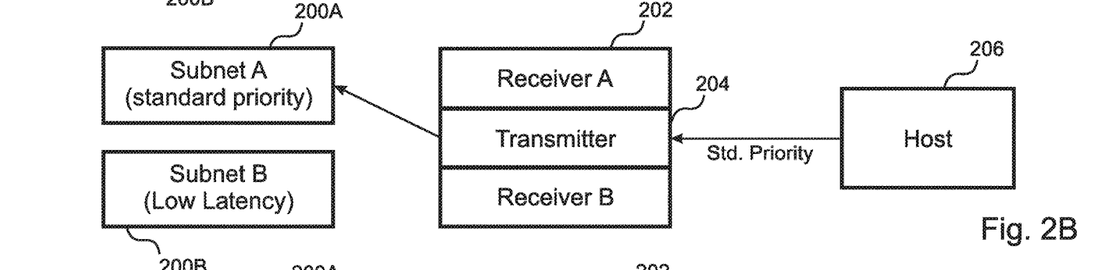
FIG. 2B is a block diagram illustrating a node transmitting a message on a standard priority subnet in an embodiment of the disclosure.
Figure 2C:
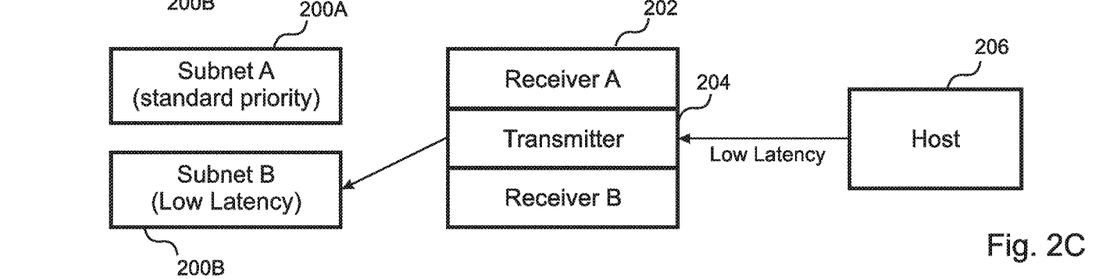
FIG. 2C is a block diagram illustrating a node transmitting a message on a low latency subnet in an embodiment of the disclosure.
Figure 3:
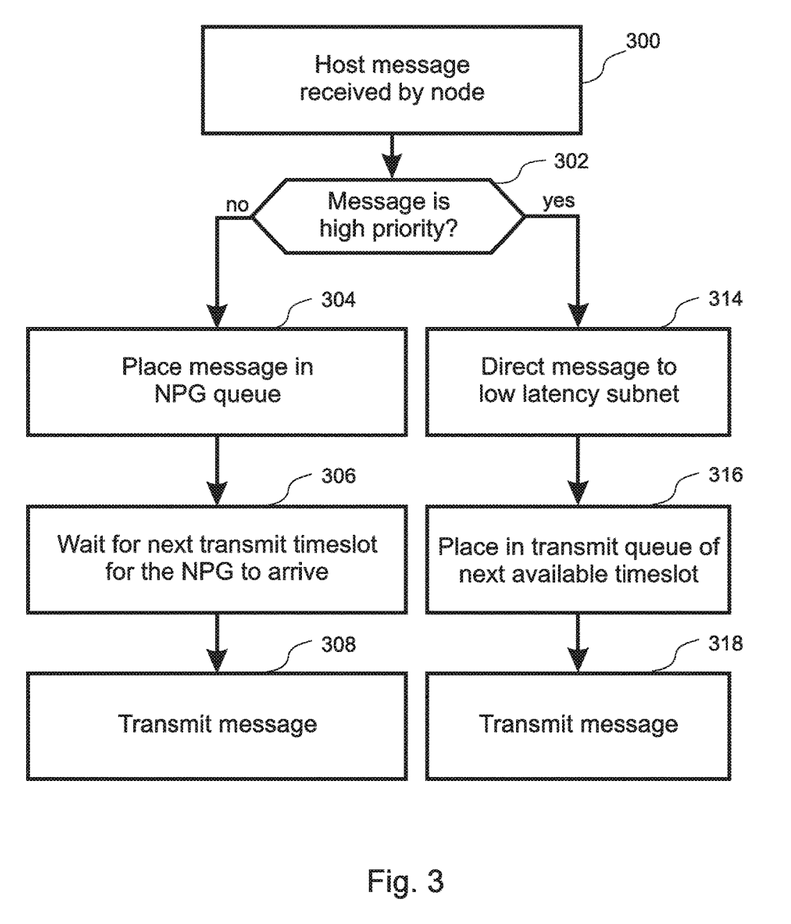
FIG. 3 is a flow diagram illustrating transmission of standard priority and high priority messages in an embodiment of the disclosure.

With reference to FIGS. 2B, 2C and 3, when the host 206 is required to transmit a message 300, it first determines if the message requires low latency transmission 302. If not, then the transmitter 204 is directed to transmit the message over the standard latency subnet 200A, as shown in FIG. 2B. Typically, the majority of network traffic will be "standard," such that the standard latency subnet 200A functions as the "default" subnet for message transmissions.

If timeslot assignments have been implemented in the standard latency subnet 200A, then the message will be queued by the host or by the transmitter 304, and will be advanced through the queue based on factors such as its relative priority and/or "staleness." Once the message has reached the front of the queue, the system will wait for the arrival of the next assigned transmission timeslot for that node 306, and then transmission of the message will begin 308.

On the other hand, with reference to FIGS. 2C and 3, if the host determines that the message requires low latency transmission 314, then the transmitter 204 is directed to transmit the message over the low latency subnet 200B. If TDMA has not been implemented on the low latency subnet, then the message is transmitted immediately. If TDMA has been implemented on the low latency subnet, then the transmission of the message will begin 318 as soon as the next timeslot arrives 316.

The low latency subnet 200B operates on a contention basis, whereby low latency messages are transmitted immediately, or in the next timeslot (if timeslots are implemented). Embodiments further include a message acknowledgement protocol that verifies receipt of high priority messages, and in some embodiments messages are transmitted on the high priority subnetwork using "jitter" to ensure that collisions are detected and re-transmissions are promptly scheduled if needed.

In embodiments, some or all of the messages transmitted on the low latency subnet 200B can include information that specifies a specific "machine receipt" ("MR") timeslot during which a response should be transmitted by the receiving node indicating successful receipt of the urgent message, whereby nodes that were not the intended recipients of the low latency message refrain from transmitting during the MR timeslot, so that collisions with the acknowledgement message are avoided. According to the embodiment, the MR timeslot can either be a timeslot of the low latency subnet 200B, or a timeslot in another, standard subnet 200A, whereby in the latter case the MR timeslot is "donated" by the node to which the MR timeslot in the standard subnet 200A was originally assigned.

In the embodiment of FIGS. 2A-2C, the nodes in the network are able to transmit on only one of the subnets 200A, 200B at a time, and are not able to receive during intervals (FIGS. 2B-2C) when they are transmitting. Accordingly, in these embodiments any assignments of timeslots in standard latency subnets as being transmit or receive timeslots are overridden when the node is transmitting an urgent message on the low latency subnet (FIG. 2C).

Embodiments implement TDMA, FDMA, and/or CDMA on either or some or all of the subnetworks 200A, 200B.

Various embodiments include a plurality of "standard priority" and/or a plurality of high priority subnetworks. In some of these embodiments that include a plurality of designated low latency ("LL") subnets, the various LL subnets can be assigned to transmit messages having associated varying degrees of urgency.

Figure 4:
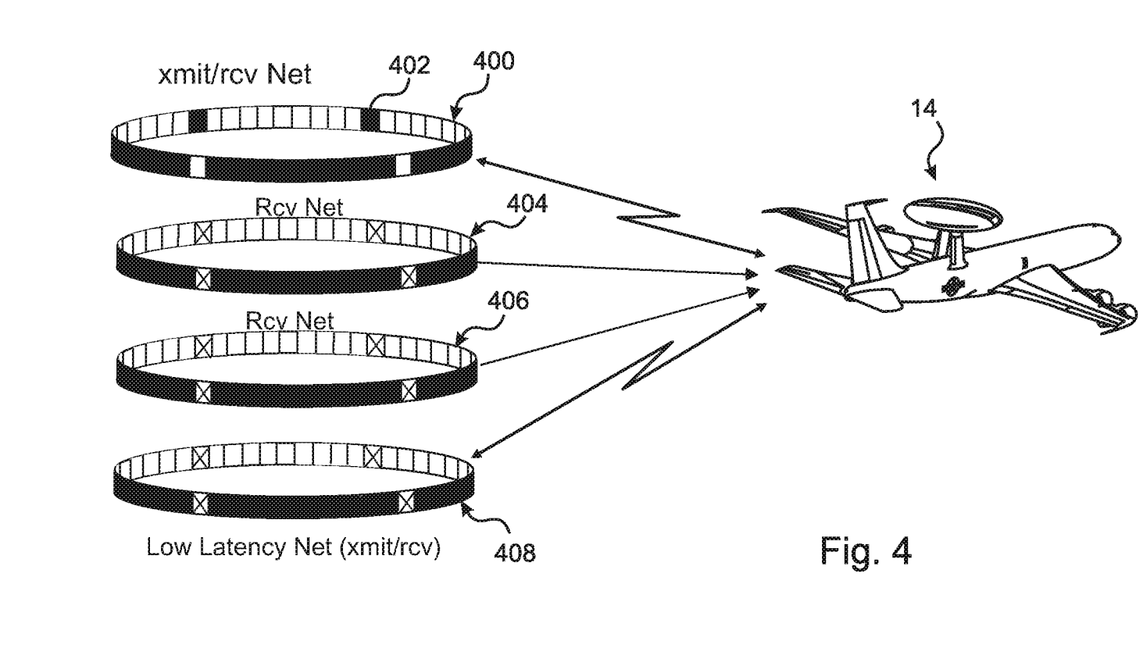
FIG. 4 is an illustration of a node transmitting a standard priority message in a Link 16 embodiment of the disclosure.

FIG. 4 illustrates an embodiment in which the wireless network is a Link 16 network. In the embodiment of FIG. 4, the disclosed apparatus and method make use of the "concurrent multi-netting" ("CMN-4") feature of Link 16, which allows each node to receive messages on four different subnets 400, 404, 406, 408 simultaneously, and thereby allows a node to belong to more than one NPG. Accordingly, one of the four CMN-4 subnets 408 in FIG. 4 is designated as the low latency subnet.

In the specific example of FIG. 4, TDMA timeslots are implemented in all four of the subnets 400, 404, 406, 408. One of the subnets 400 is designated as the "default" subnet for the node, in which certain timeslots 402 are assigned to the node as transmit timeslots. In the figure, four transmit timeslots 402 are indicated as being spaced apart in the default subnet 400 at approximately equal intervals within each epoch. The node also monitors signals that are received in two other standard latency subnets 404, 406, but does not transmit on those subnets 404, 406.

As indicated by the "X" markings in the figure, the receivers do not operate when the node is transmitting, such that messages in corresponding timeslots of the other subnets 404, 406, 408 are not received if the node is making use of one of the assigned transmit timeslots 402 in the "default" subnet 400. In similar embodiments, transmit timeslots are assigned to the node in each of the three standard latency subnets 400, 404, 406. In still other embodiments, one or more of the "standard" subnets 400, 404, 406 may implement a "contention" timeslot access strategy, whereby timeslots are not assigned to the nodes as being either transmit or receive (or relay) timeslots.

Figure 5:
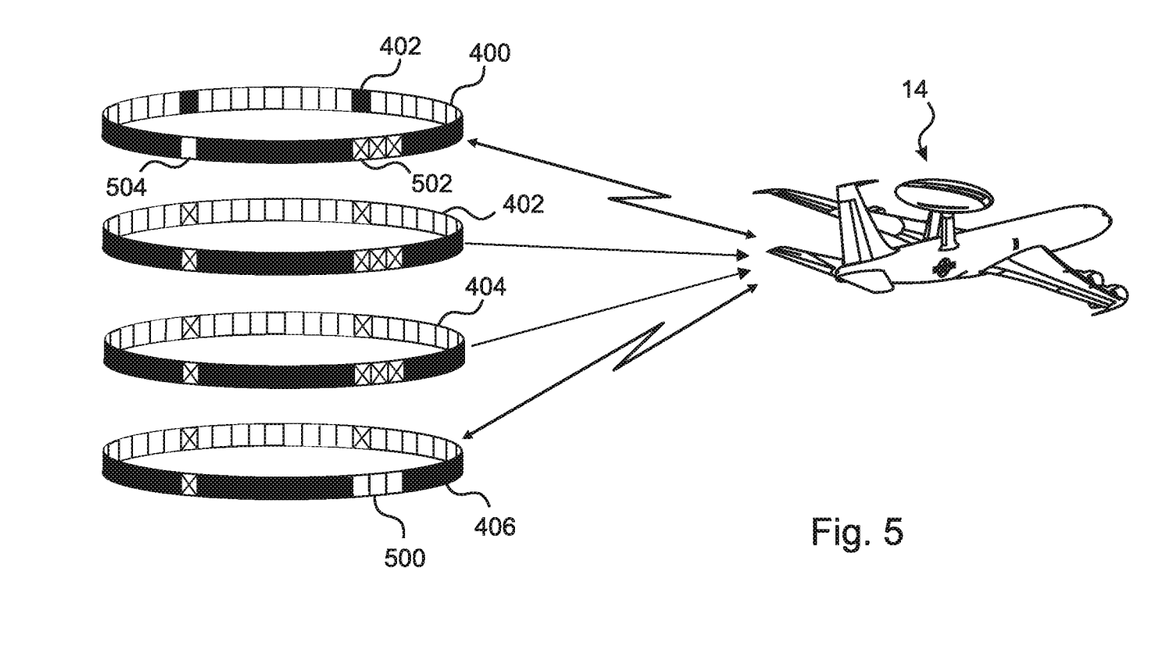
FIG. 5 is an illustration of a node transmitting a high priority message in a Link 16 embodiment of the disclosure.

FIG. 5 illustrates the Link 16 network of FIG. 4 as configured when the node is transmitting a low latency message. In the illustrated example, the node is transmitting a message over three consecutive timeslots 500 in the low latency network 406, thereby preventing the transmission or reception of any information on any of the other three subnets 400, 404, 406 during those timeslots. Essentially, the low latency message "overrides" the assignment of one of the assigned transmit timeslots 502 in the default subnet 400, which would otherwise have been used to transmit a message during that epoch. Once the transmission of the low latency message is complete, transmission of standard messages by the node commences upon arrival of the next assigned transmit timeslot 504 in the default subnet 400.

Depending on the embodiment, the designation of low latency, high urgency messages in the Link 16 network is accomplished either by creating a special "low latency" NPG, or by identifying a set of J-series messages. In various Link 16 embodiments, an internal time slot assignment is defined which allows nodes to transmit on any time slot in the LL subnet using net number and cryptographic keys provided in the initialization data, thereby enabling the LL subnet to be isolated cryptographically, and thereby providing additional protection and isolation of critical messages.

In embodiments, the Link 16 Concurrent Contention Receive (CCR) functionality manages timeslot contention in the low latency subnetwork 406. In various embodiments, the latency of the high priority, low latency subnetwork is no greater than 40 milliseconds.

Embodiments further implement message prioritization, whereby urgent messages to be transmitted by a node are designated as being high priority and are moved to the front of the node's messaging queue and transmitted out of sequence.

Figure 6:
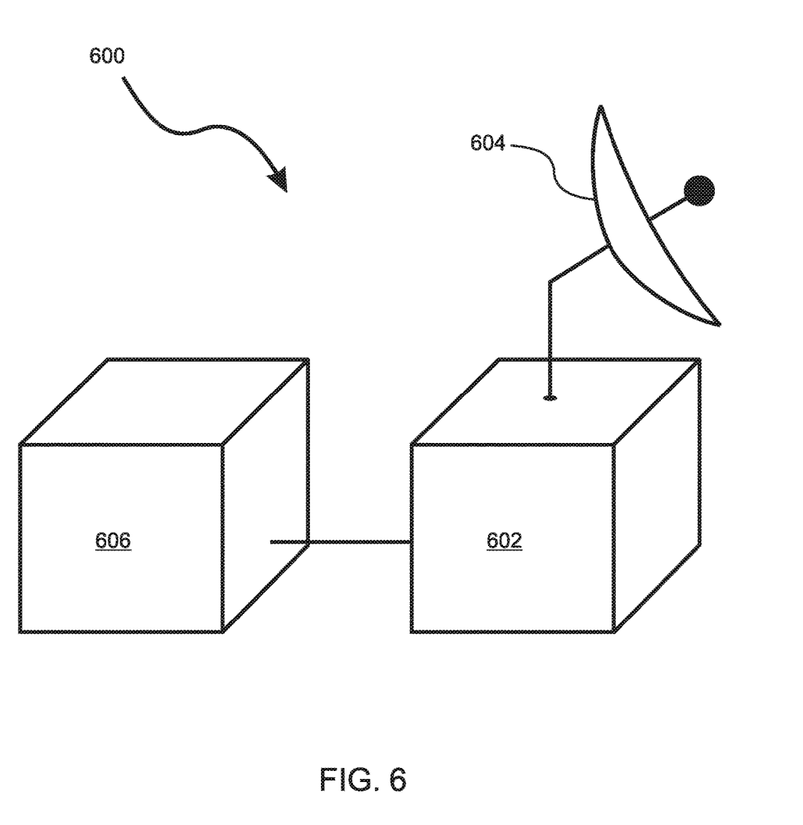
FIG. 6 is a block diagram illustrating an embodiment of the disclosed apparatus.

With reference to FIG. 6, the apparatus disclosed herein 600 includes a transceiver 602 in communication with at least one antenna 604 and configured to receive both relayed and non-relayed messages from other nodes in the network. The apparatus further comprises a processor 606 that controls the operation of the transceiver, performs required calculations and message analysis according to the disclosed method, and provides a user interface for interaction with an operator.

The processor 606 is an instruction execution machine, apparatus, or device and may comprise one or more of a microprocessor, a digital signal processor, a graphics processing unit, an application specific integrated circuit (ASIC), a field programmable gate array (FPGA), and the like. The processor 606 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

The invention illustratively disclosed herein suitably may be practiced in the absence of any element which is not specifically disclosed herein and is not inherently necessary. However, this specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method of reducing message latency for high priority messages transmitted over a wireless, multiple access network, the method comprising:
    implementing at least one simultaneous messaging protocol so as to create at least two subnets within the network;
    designating one of the subnets as a low latency subnet;
    configuring the low latency subnet as a contention access subnet;
    enabling a plurality of nodes in the network to receive messages simultaneously on the low latency subnet and at least one other of the subnets;
    enabling the plurality of nodes to designate messages before they are transmitted as being standard messages or high priority messages; and
    causing the nodes to transmit only messages designated as high priority messages over the low latency subnet.

2. The method of claim 1, wherein transmitting a high priority message on the low latency subnet includes using jitter to ensure that a collision is detected if two high priority messages are simultaneously transmitted on the low latency subnet.

3. The method of claim 1, wherein transmitting a high priority message on the low latency subnet further includes determining if the high priority message was received by an intended recipient and, if the high priority message was not received by the intended recipient, re-transmitting the high priority message to the intended recipient on the low latency subnet.

4. The method of claim 1, wherein implementing the at least one simultaneous messaging protocol includes implementing Frequency Division Multiple Access.

5. The method of claim 1, wherein implementing the at least one simultaneous messaging protocol includes implementing Time Division Multiple Access so as to define epochs that are subdivided into timeslots.

6. The method of claim 5, wherein transmitting messages over the low latency subnet comprises beginning transmission of the high priority message upon commencement of a next timeslot to arrive after the high priority message is obtained for transmission.

7. The method of claim 5, wherein transmitting a high priority message on the low latency subnet can include transmitting instructions designating a subnet and timeslot in which to transmit an acknowledgement message indicating receipt of the high priority message.

8. The method of claim 1, wherein transmitting by a node of a high priority message over the low latency subnet includes moving the high priority message to a front of a queue of messages that are awaiting transmission by the node.

9. The method of claim 1, further comprising:
    designating a subnet that is not the low latency subnet as a medium priority subnet;
    configuring the medium priority subnet as a contention access subnet;
    enabling each of the plurality of nodes to designate messages before they are transmitted as being standard messages, high priority messages, or medium priority messages; and
    causing the nodes to transmit messages designated as medium priority messages over the medium priority subnet.

10. The method of claim 1, wherein the network is a Link 16 network that implements Frequency Division Multiple Access and Time Division Multiple Access.

11. The method of claim 10, wherein four-channel concurrent multi-netting ("CMN-4") is implemented on the network, thereby allowing the plurality of nodes to simultaneously receive messages on four subnets.

12. The method of claim 10, wherein the low latency subnet is associated with a high priority Network Participation Group, and nodes are able to designate messages as high priority messages by assigning them to the high priority Network Participation Group.

13. The method of claim 10, wherein the nodes are able to designate a message as a high priority message by applying a designated, high priority J-label or J-sublabel to the message.

14. The method of claim 10, wherein the Link 16 Concurrent Contention Receive (CCR) functionality manages timeslot contention in the low latency subnetwork.

15. The method of claim 10, further comprising defining an internal time slot assignment that enables nodes to transmit on any time slot in the low latency subnet using net number and cryptographic keys provided in initialization data.

16. An apparatus configured for participation as a node in a wireless, multiple access communication network, the apparatus comprising:
- at least one processor, wherein the processor has a user interface;
- a transceiver in electronic communication with the user interface;
- at least one antenna coupled to the transceiver; and
- non-transient software operable on the at least one processor and able to direct the at least one processor to:
  - implement at least one simultaneous messaging protocol so as to create at least two subnets within the network;
  - designate one of the subnets as a low latency subnet;
  - configure the low latency subnet as a contention access subnet;
  - enable a plurality of nodes in the network to receive messages simultaneously on the low latency subnet and at least one other of the subnets;
  - enable the plurality of nodes to designate messages before they are transmitted as being standard messages or high priority messages; and
  - cause the nodes to transmit only messages designated as high priority messages over the low latency subnet.

* * * * *